United States Patent [19]
Hahn

[11] Patent Number: 5,934,051
[45] Date of Patent: Aug. 10, 1999

[54] SOLID STATE MOW SYSTEM FOR ELECTRICALLY POWERED MOWER

[75] Inventor: Robert W. Hahn, Racine, Wis.

[73] Assignee: Textron, Inc., Providence, R.I.

[21] Appl. No.: 08/798,424

[22] Filed: Feb. 6, 1997

[51] Int. Cl.⁶ .......................... A01D 75/28; B60K 28/00
[52] U.S. Cl. .................... 56/10.2 R; 56/10.2 A; 56/10.5; 180/273
[58] Field of Search .......................... 56/10.2 R, 10.2 A, 56/10.5; 180/273

[56] References Cited

U.S. PATENT DOCUMENTS

| | | |
|---|---|---|
| 2,057,417 | 10/1936 | Clapper . |
| 2,417,613 | 3/1947 | Radabaugh . |
| 2,597,735 | 5/1952 | Jepson . |
| 3,229,452 | 1/1966 | Hasenbank . |
| 3,410,063 | 11/1968 | Speiser . |
| 3,425,197 | 2/1969 | Kita . |
| 3,429,110 | 2/1969 | Strasel . |
| 3,511,033 | 5/1970 | Strasel . |
| 3,511,034 | 5/1970 | Strasel . |
| 3,602,772 | 8/1971 | Hundhausen et al. . |
| 3,608,285 | 9/1971 | Berk . |
| 3,613,337 | 10/1971 | Akgulian et al. . |
| 3,631,659 | 1/1972 | Horowitz . |
| 3,650,097 | 3/1972 | Nokes . |
| 3,729,912 | 5/1973 | Weber . |
| 3,732,671 | 5/1973 | Allen et al. . |
| 3,732,673 | 5/1973 | Winn, Jr. . |
| 3,742,685 | 7/1973 | Lian et al. . |
| 3,809,975 | 5/1974 | Bartels . |
| 3,841,069 | 10/1974 | Weck . |
| 3,924,389 | 12/1975 | Kita . |
| 3,958,398 | 5/1976 | Fuelling, Jr. et al. . |
| 4,021,996 | 5/1977 | Bartlett et al. . |
| 4,024,448 | 5/1977 | Christianson et al. . |
| 4,145,864 | 3/1979 | Brewster, Jr. . |
| 4,178,741 | 12/1979 | Lonn et al. ............................. 56/10.2 |
| 4,306,402 | 12/1981 | Whimp . |
| 4,335,569 | 6/1982 | Keeney et al. .......................... 56/10.2 |
| 4,430,604 | 2/1984 | Loganbill et al. . |
| 4,680,922 | 7/1987 | Arnold . |
| 4,685,280 | 8/1987 | Lloyd et al. . |
| 4,686,445 | 8/1987 | Phillips . |
| 4,718,286 | 1/1988 | Eller . |
| 4,756,375 | 7/1988 | Ishikura et al. . |
| 4,878,338 | 11/1989 | Aldred et al. . |
| 4,943,758 | 7/1990 | Tsurumiya . |

(List continued on next page.)

FOREIGN PATENT DOCUMENTS

| | | |
|---|---|---|
| B-84961/91 | 10/1994 | Australia . |
| 5-15233 | 1/1993 | Japan . |
| WO 93/1264 | 7/1993 | WIPO . |

OTHER PUBLICATIONS

Owner's Manual and Parts List for Jacobsen 22" Electric Putting Green Mower, Model 110, Serial No. 1601–Up, pp. 1–15.

Toro Brochure entitled "Greenmaster® 3100" dated 1993.

Toro Brochure entitled "What mower gives greens the kindest cut of all?" dated Feb. 1994.

Jacobsen Brochure for Tri–King™ Triplex Mowers dated 1992.

Ransomes Brochure.

Primary Examiner—Michael J. Carone
Assistant Examiner—Fredrick T. French, III
Attorney, Agent, or Firm—Brinks Hofer Gilson & Lione

[57] ABSTRACT

A solid state mow system monitors and controls operations of a greens maintenance machine. This solid state system controls the other systems on the machine including: an interlock system, a reel lift control system, a cutting unit control system, a groomer control system, a backlap control system, a mow relay system or any other greens maintenance type system. The interlock system monitors input and output signals to determine if all of the preconditions to operation have been satisfied. The lift control system controls raising and lowering the cutting units. The mow control system controls the operation of cutting unit motors.

29 Claims, 10 Drawing Sheets

U.S. PATENT DOCUMENTS

| | | |
|---|---|---|
| 4,947,630 | 8/1990 | Rich et al. . |
| 4,995,227 | 2/1991 | Foster . |
| 5,007,234 | 4/1991 | Shurman et al. . |
| 5,042,239 | 8/1991 | Card . |
| 5,085,043 | 2/1992 | Hess et al. . |
| 5,101,802 | 4/1992 | Reinhard ................................ 180/273 |
| 5,109,945 | 5/1992 | Koga ...................................... 180/273 |
| 5,133,174 | 7/1992 | Parsons, Jr. . |
| 5,140,249 | 8/1992 | Linder et al. . |
| 5,150,021 | 9/1992 | Kamono et al. . |
| 5,204,814 | 4/1993 | Noonan et al. . |
| 5,261,213 | 11/1993 | Humphrey . |
| 5,323,593 | 6/1994 | Cline et al. ............................... 56/10.2 |
| 5,406,778 | 4/1995 | Lamb et al. . |
| 5,417,193 | 5/1995 | Fillman et al. . |
| 5,425,431 | 6/1995 | Brandt et al. ........................... 180/273 |
| 5,481,078 | 1/1996 | Asche ...................................... 180/273 |
| 5,490,370 | 2/1996 | McNair et al. ....................... 56/10.2 R |
| 5,502,957 | 4/1996 | Robertson . |
| 5,540,037 | 7/1996 | Lamb et al. . |
| 5,552,240 | 9/1996 | Derstine . |
| 5,553,445 | 9/1996 | Lamb et al. . |
| 5,616,964 | 4/1997 | Peterson, Jr. ............................ 180/273 |
| 5,690,186 | 11/1997 | Sugioka et al. ......................... 180/273 |
| 5,711,391 | 1/1998 | Brandt et al. ........................... 180/273 |

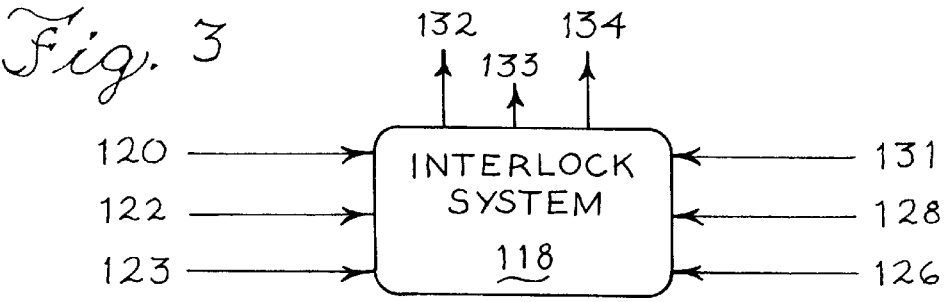
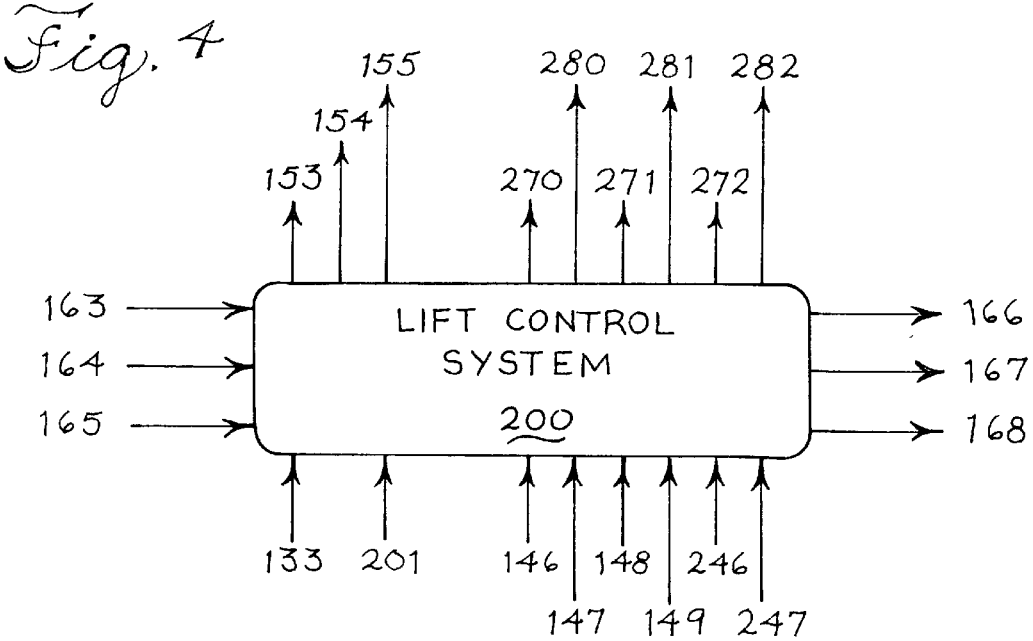
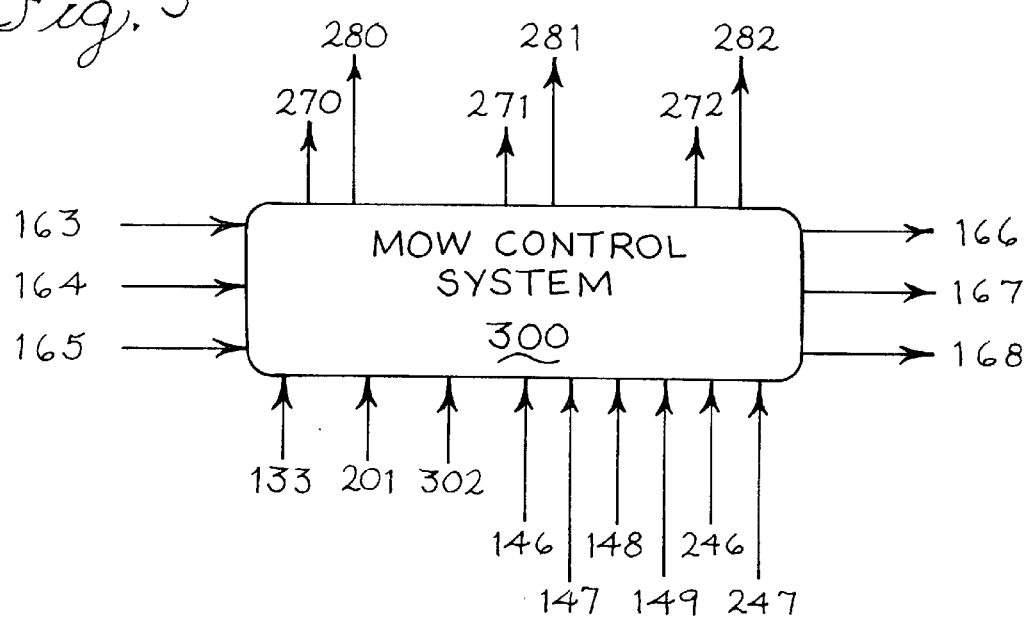

FIGURE 9

| TERM | TYPE | DESCRIPTION |
|---|---|---|
| ALL_DOWN | STATE | All of the reels are down or bypassed |
| ALL_UP | STATE | All of the reels are up |
| BACKLAP_OFF# | STATE | Backlap # is off |
| BACKLAP_ON# | STATE | Backlap # is active |
| BACKLAP_ARMED# | STATE | Backlap # is ready to go active |
| BYPASS# | STATE | The reel is bypassed |
| BYPASS_RAISE# | STATE | The reel is bypassed in the MACHINE_RAISE |
| DOWN# | STATE | The reel is down |
| FAULT | STATE | The cutting unit control module detected a fault in the cutting unit motors |
| GROOM_OFF# | STATE | Groomer # is off |
| GROOM_ON# | STATE | Groomer # is on |
| INTERLOCK_OFF | STATE | Interlock relay is off |
| INTERLOCK_ON | STATE | Interlock indicator is active. Interlock signal is active. |
| LOWER# | STATE | Lift # is active to lower |
| LOWER_DELAY# | STATE | Lift # lower delay timer is active |
| MOW_RELAY_LATCH_OFF | STATE | Mow relay is latched off |
| MOW_RELAY_OFF | STATE | Mow relay is off |
| MOW_RELAY_ON | STATE | Mow relay is active |
| POWERUP | STATE | Power has just been applied |
| RAISE# | STATE | Lift # is active to raise |
| RAISE_DELAY # | STATE | Lift # raise delay timer is active |
| REEL_OFF# | STATE | Reel motor is off |
| REEL_ON# | STATE | Reel # is active |
| UP# | STATE | Lift # is up |
| MACHINE_LOWER | STATE | Machine is in an overall lower mode |
| MACHINE_RAISE | STATE | Machine is in an overall raise mode |
| MOW_ENABLE | SIGNAL | Pulled to ground when active |
| BACKLAP | SWITCH | Closed when active |
| BRAKE | SWITCH | Closed when active |
| DL# | SWITCH | Closed when active |
| FOOT | SWITCH | Closed when active |
| GROOM | SWITCH | Closed when active |
| KEY_I | SWITCH | Closed when active |
| KEY_S | SWITCH | Closed when active |
| MASTERMOW | SWITCH | Closed when active |
| SEAT | SWITCH | Closed when active |
| UL# | SWITCH | Closed when active |
| IM# | SWITCH | Closed when active |
| LOWER_DELAY_TIMER# | TIMER | Lift # lower delay is completed |
| RAISE_DELAY_TIMER# | TIMER | Lift # lower delay is completed |
| / |  | NOT |
| ↑ |  | INACTIVE TO ACTIVE TRANSITION |
| * |  | AND |
| + |  | OR |

SOLID STATE MOW SYSTEM FOR ELECTRICALLY POWERED MOWER

BACKGROUND OF THE INVENTION

1. Field of the Invention

This invention relates in general to a system for controlling electrically powered vehicles and relates more particularly to a solid state control system used to monitor and control all operations of an electrically powered mower.

2. Prior Art

Current controls for electrically powered vehicles in the market place are not durable. Specifically, when a mower is used in moist environments and in environments where it can get covered with grass and other debris, the electric controls and the wires connecting the controls deteriorate thus decreasing the life of the mower. There is a need in the art, therefore, for an electric mower powered by a solid state control system that would be more durable in dirty environments.

SUMMARY OF THE INVENTION

The present invention relates to a solid state system used to monitor and control operations of a greens maintenance machine or a mower. One object of the present invention is to minimize damage caused by moisture and debris by providing the electric controls in a solid state configuration.

Another object of the current invention is the reduction in electro-mechanical components. By using solid state components, groups of physical mechanical components and the functions they perform are replaced by a single micro chip. Physical wear and tear on the mechanical pieces is removed and the corresponding wear on the solid state components is small.

Providing solid state control also allows for the implementation of diagnostic routines designed to locate a malfunction and provide information on what the malfunction is and aid in troubleshooting.

Further, by switching to a solid state control system, the mower can be designed with a variable amount of operator interface. Either the operator can control every decision made while the mower is operational, or he can allow the control system to make as many decisions.

Further objects of the invention include monitoring and controlling different operations of the mower. An interlock system monitors various input signals to determine if certain preconditions have been met for proper operation of the machine. The lift control system controls the raising and lowering of the cutting units on the operator's commands. The mow control system controls the operation of motors that power the cutting units.

The battery in the mower provides a longer active life if the load applied to it remains constant. Another object of the current invention, therefore, is to regulate the mower drive motor speed to reduce the effects of varying loads on battery state of charge.

The control system of this electric mower is designed to balance ease and cost of assembly with ease and cost of repair. These objects are accomplished either by having multiple, integrated modules or by having o e module control all of the functions.

Other objects, features, and advantages of the present invention will be apparent from the accompanying drawings and from the detailed description that follows

BRIEF DESCRIPTION OF THE DRAWINGS

The present invention is illustrated by way of example and not limitation in the figures of the accompanying drawings, in which like references indicate similar elements and in which:

FIG. 3 shows the interlock control system inputs and outputs;

FIG. 4 shows the lift control system inputs and outputs;

FIG. 5 shows the mow control system inputs and outputs;

FIG. 9 is a key for state diagram descriptions;

DETAILED DESCRIPTION OF THE PREFERRED EMBODIMENTS

Figure 1:
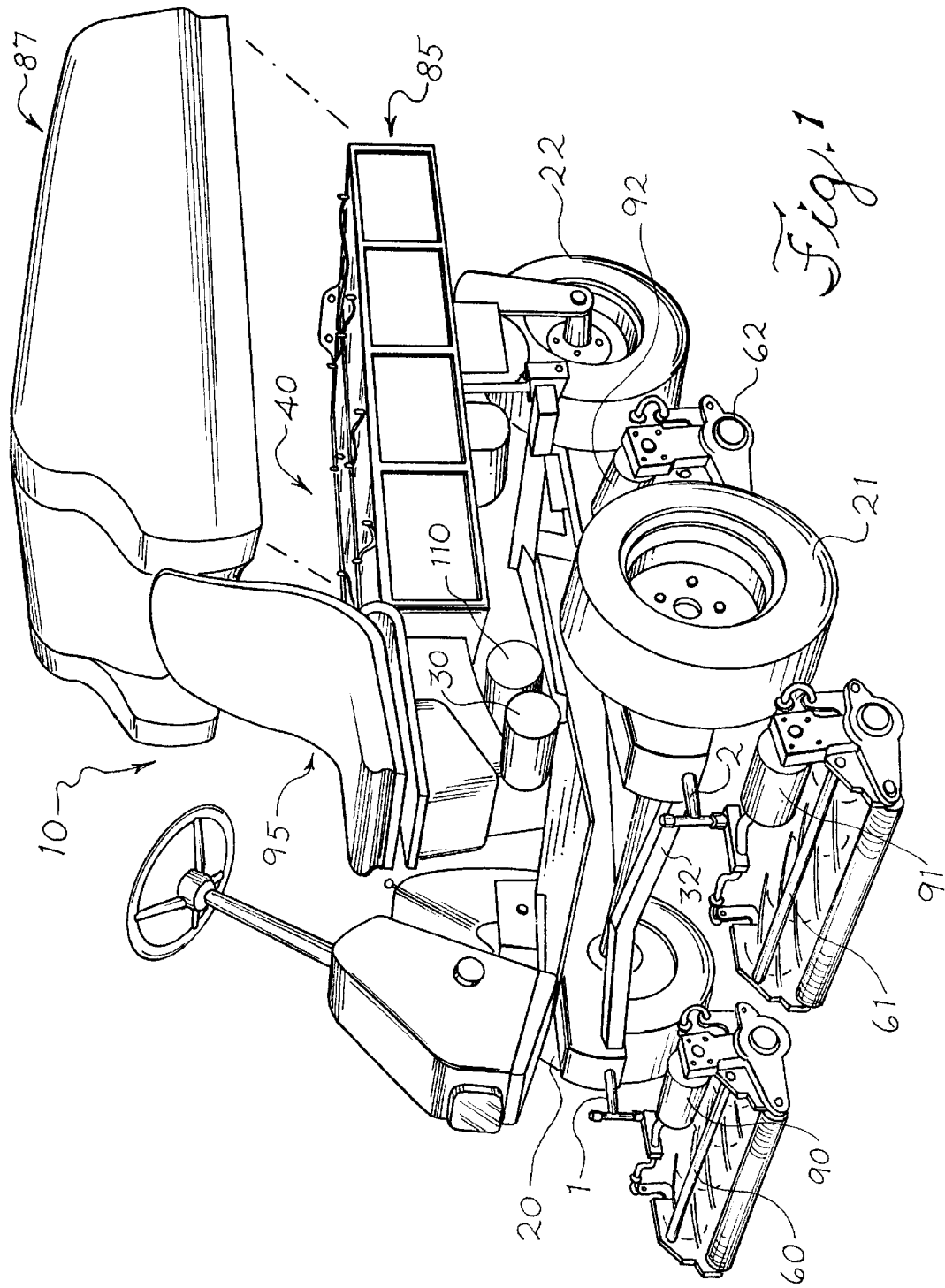
FIG. 1 is a general drawing of the electric mower.

In the Figures, a solid state mow system 100 is provided for an electric mower 10. FIG. 1 is a general illustration of the mower 10 utilizing the present invention. In the embodiment shown in FIG. 1, the mower 10 includes wheels 20, 21, and 22. Two front drive wheels 20 and 21 are powered by electric drive motor 30. The rear wheel 22 is positioned behind and between the two front drive wheels 20 and 21 and is pivotable to steer the mower 10. Of course a different number of wheels could be used, and a different combination of power and steering wheels could also be designed while still remaining within the scope of the present invention. The cutting units 60, 61, and 62 are positioned ahead of each of the wheels 20, 21, and 22 respectively. Ideally, the cutting units are reel cutting units, but also can be rotary cutting units, or other types of cutting units. The cutting units 60, 61, and 62 are mounted on lifts 1, 2, and 3 (not shown). In one embodiment, the lifts 1, 2, and 3 (not shown) comprise electric linear actuators, although other means are possible such as hydraulics, pulleys, or gears. The operator selectively raises and lowers the lifts 1, 2, and/or 3 (not shown) depending on which cutting unit 60, 61, and/or 62, the operator wishes to use. When the cutting units 60, 61, and 62 are in the lowered or operative position, the lifts 1, 2, and 3 (not shown) allow free vertical motion of the cutting units 60, 61, and 62 producing an even cut over an undulating surface such as an uneven golf course green.

The drive motor 30 is powered by a battery set 40. Ideally, more than one battery are provided in the battery set 40 to deliver optimum power to the electric mower 10. On small units, however, a single battery constituting the battery set 40 is possible. In the embodiment disclosed herein, the battery set 40 comprises eight lead-acid batteries. The batteries in the set 40 are located in the battery tray 85 shown in FIG. 1 with battery tray hood 87 removed.

The operator seat 95 is positioned above the front axle 32. In the preferred embodiment, the main control system 100 is centrally located in an enclosure 110 underneath the seat 95 and above the axle 32. The main control system 100 could be located almost anywhere on the mower. In the preferred embodiment, it is placed underneath the seat for ease of access for service purposes. The enclosure 110 is for styling, mounting convenience and protection from the environment. Although a centrally located main control system 100 is preferred, in an alternate embodiment, small remote units control each of the individual motors 80, 81, and 82 (FIG. 2(2) powering the lifts 1, 2, and 3 (not shown) mounted on the frame near the lifts 1, 2, and 3 (not shown). Mounting the control units near their respective mowing units may reduce both wiring and electromagnetic interference.

As described above, the main control system 100 is powered by a set of batteries 40. In the preferred embodiment, the main control system 100 operates on a 48 volt DC nominal battery system. Usually, eight batteries are in the battery set 40, although a different number will work as well depending on the desired operating voltage, the range of the battery set 40, and the size of the mower 10. Those skilled in the art will recognize that fewer batteries in the battery set will power the mower 10 for less time before needing to be recharged. Although lead-acid batteries are preferred, other types of batteries can be used as well including, nickel cadmium, lithium-ion, zinc air, iron-sulfur, etc.

The mower 10 will normally be used in ambient temperatures from around 20 degrees Fahrenheit to around 120 degrees Fahrenheit. Although the amount of heat dissipated by the electric mower 10 of the present invention is far less than the prior art gas powered mower, some heat from internal heat dissipation, from the sun, and from the proximity to the motor 30 will elevate temperatures. Ideally, such heat radiates out through the enclosure 110. The semiconductors are attached to the enclosure and use it as a heat sink to transfer heat out to the environment.

The enclosure 110 of the main control system 100 is designed to reduce environmental exposure. Since normal operation of the mower 10 includes a wash down with water, and such water may be contaminated with at least residual amounts of chemicals. The enclosure 110 is sealed so that the main control system 100 is protected against contamination. The materials used to seal the enclosure 110 should help prevent chemicals such as fertilizers, weed killers, saline solutions and pesticides from compromising the enclosure 110 and thus damaging the controls. Typical materials used to enclose the main control system 100 include steel with a protective coating such as paint, aluminum with or without a protective coating, various plastics, and other appropriate materials.

Figure 2:
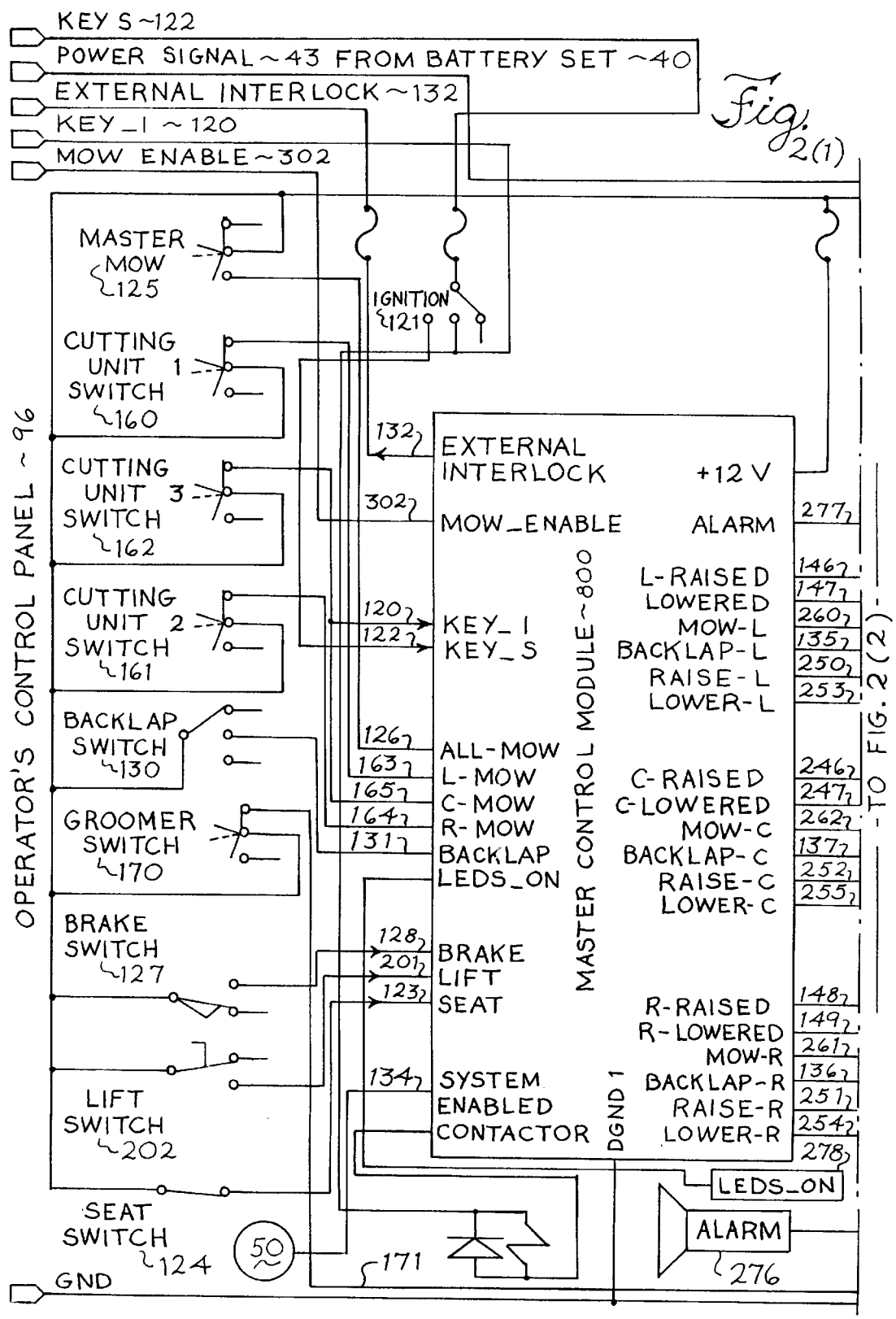
FIGS. 2(1), 2(2), and 2(3) are subparts that together comprise a schematic of the various control systems.
Figure 2:
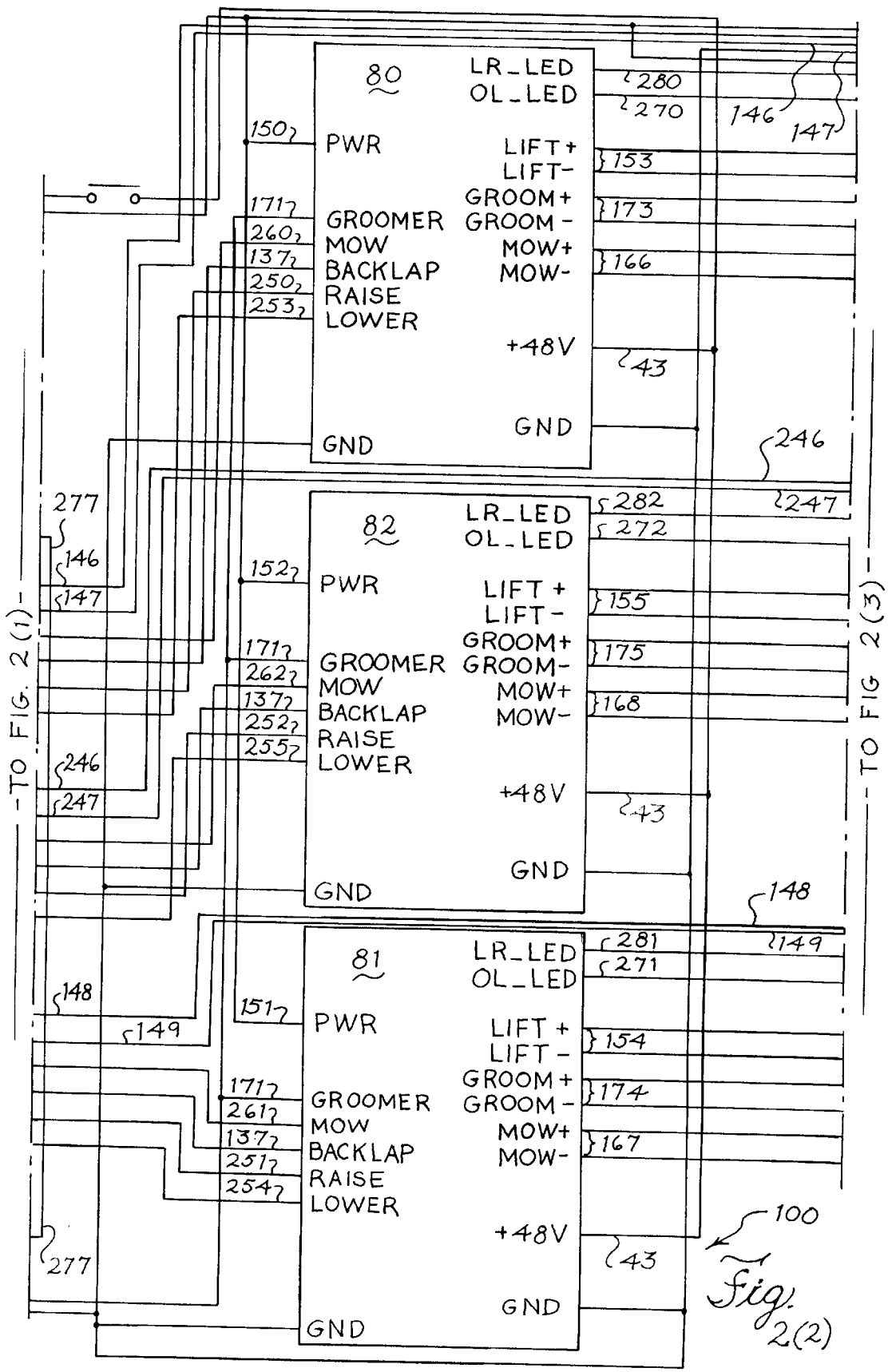
Figure 2:
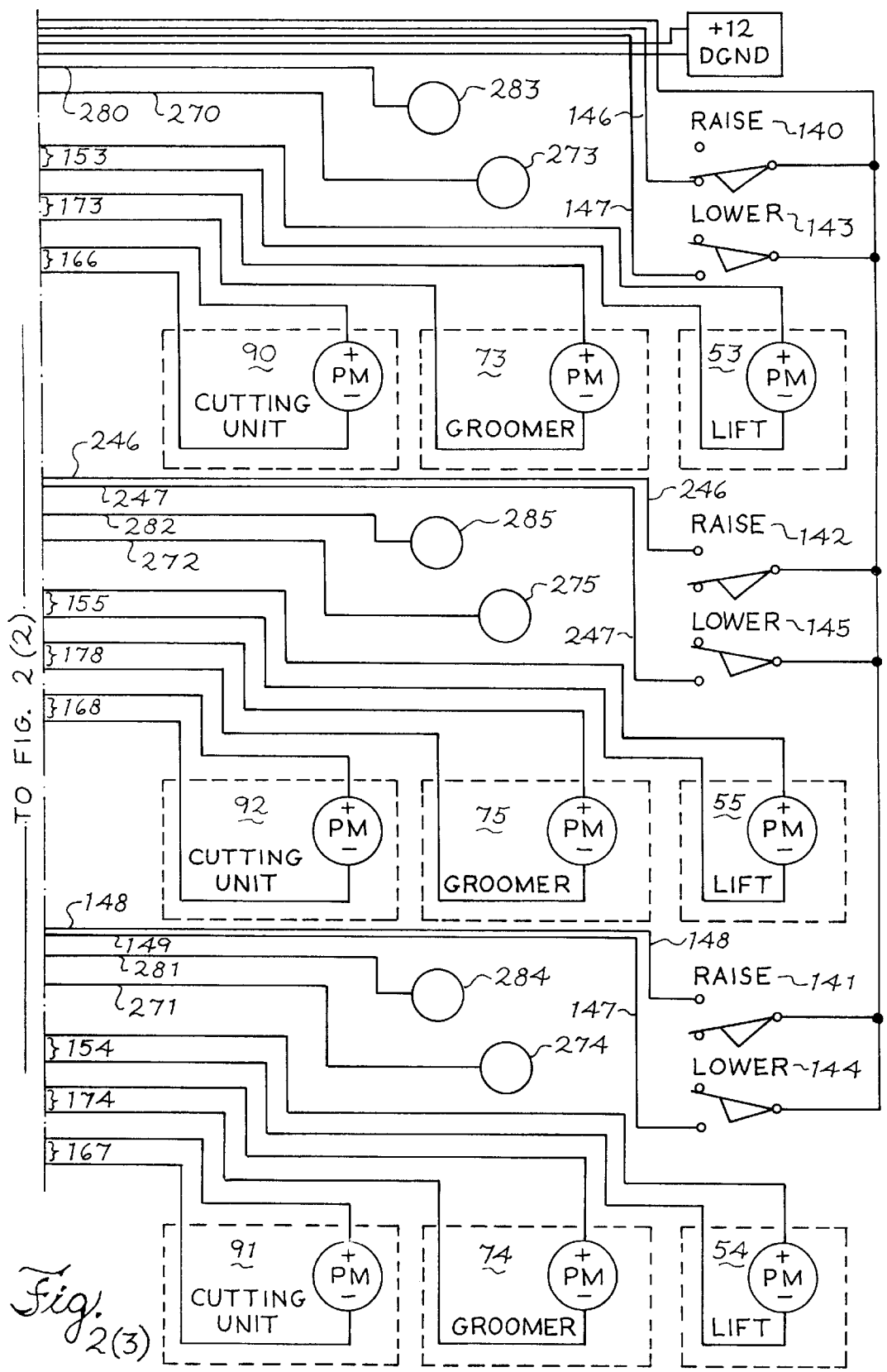
Figure 6:
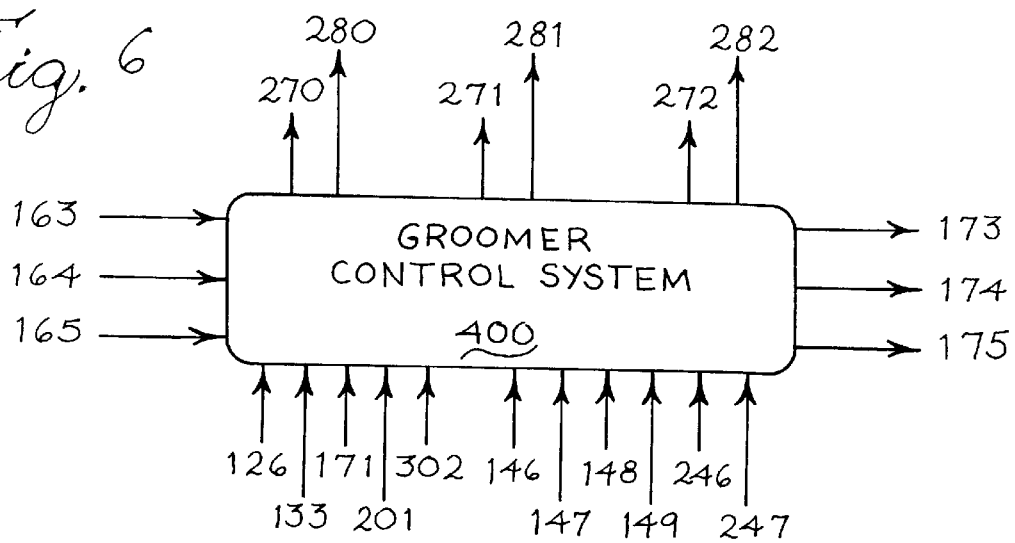
FIG. 6 shows the groomer control system inputs and outputs.
Figure 7:
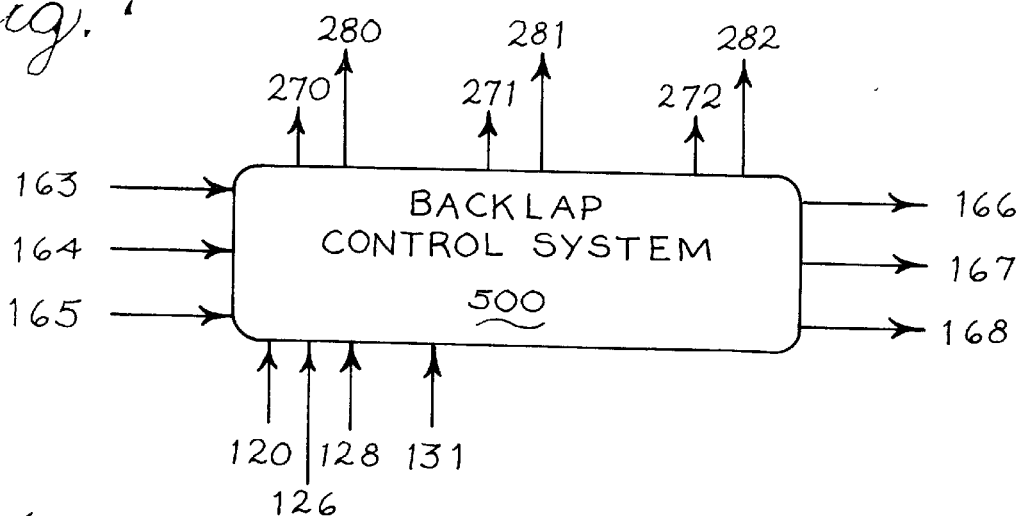
FIG. 7 shows the backlap control system inputs and outputs.
Figure 8:
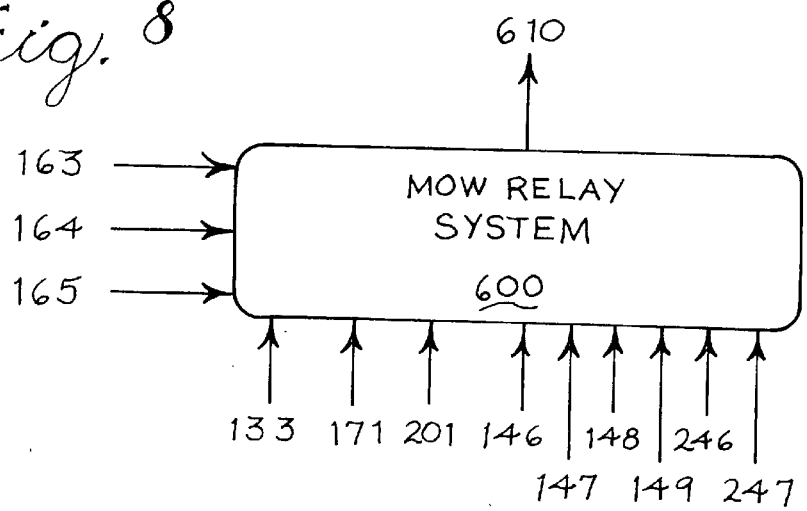
FIG. 8 shows the mow relay control system inputs and outputs.

FIGS. 2(1), 2(2), and 2(3) are subparts that together comprise a schematic of the main control system 100 and its interfaces with the various parts of the electric mower 10. FIGS. 2(1), 2(2), and 2(3) will be discussed generally at this point and then specifically with reference to each of the control systems below. The master control module 800 incorporates controls for all of the mower systems including the interlock system 118 (FIG. 3), the lift control system 200 (FIG. 4), the mow control system 300 (FIG. 5), the groomer control system 400 (FIG. 6), the backlap control system 500 (FIG. 7), and the mow relay system 600 (FIG. 8) each of which is described in more detail below. The master control module 800 also communicates with the remote cutting unit control modules 80, 81, and 82 that control operations of each of the cutting units 60, 61, and 62.

The master control module 800 receives inputs from other systems on the mower 10. The master control module 800 receives power from the battery set 40 via the ignition 121. The control panel 96 allows the operator to interface with the various systems in the master control module 800. Several switches are located on the control panel 96. These switches include a master mow switch 125 which when activated sends an ALL_MOW signal 126 to the master control module 800 instructing that all of the cutting units 60, 61, and 62 are ready to operate. The operator can select or deselect each of the cutting units 60, 61, and 62 individually by using their individual cutting unit switches 160, 161, and 162. Each switch sends a signal 163, 164, and 165 respectively to the master control module 800 indicating the state of its activity.

When sharpening of the cutting units 60, 61, and 62 is necessary, the mower 10 is put into the backlap mode (described further below). In the backlap mode, the cutting units 60, 61, and 62 run in reverse. In the preferred embodiment, certain safety preconditions must be met before the backlap mode will be activated. These preconditions are discussed in detail below.

In order to access backlap mode, the operator must activate the backlap switch 130 located on the control panel 96. A backlap signal 131 is sent the master control module 800 which processes the signal and sends a signal 135, 136, and 137 to each of the cutting units 60, 61, and 62 to operate in the backlap mode.

Each cutting unit 60, 61, and 62 on the mower 10 has an optional turf grooming apparatus called a groomer 70, 71, and 72 (discussed in more detail below). The operator controls operation of the groomers 70, 71, and 72 from thp groomer switch 170 also located on the control panel.

When the operator depresses the brake pedal (not shown), a brake switch signals the master control module 800 along line 128 that the brake has been activated. Similarly, the mower 10 also has a lift switch 202 which in the preferred embodiment is a pedal (not shown) that operates as a toggle. When the operator depresses the lift pedal, the lift switch 202 signals 201 the master control module 800 that the state of the lifts 1, 2, and 3 (not shown) has been toggled. There is also a switch 124 operably connected to the operator's seat 95. When the operator is properly positioned in the seat 95, the seat switch 124 signals the master control module 800 along line 123.

When the system is enabled, the master control module sends an external interlock signal 132 to other systems on the mower 10.

The master control module 800 provides commands to and receives information from the cutting unit control modules 80, 81, and 82. The master control module 800 sends a signal 260, 261, and 262 to each of the cutting unit control modules 80, 81, and 82 directing the cutting units 60, 61, and 62 to mow. When the operator activates the master mow switch 125 or any of the individual cutting unit switches 160, 161, and/or 162, the master control module 800 send a signal 135, 136, and/or 137 to each of the cutting unit control modules 80, 81, and/or 82 to power the cutting unit motors 90, 91, and 92.

When the preconditions to entering the backlap mode have been met (as described below), and the master control module 800 receives a backlap signal 131 from the control panel 96, and the selected individual cutting unit signals 160, 161, and 162 from the control panel 96, the master control module 800 sends a backlap signal 135, 136, and/or 137 to each of the cutting unit control modules 80, 81, and/or 82 of the selected cutting units 60, 61, and 62.

Upon receiving commands from the lift switch 202, the master control module 800 sends specific signals 250 or 251, 252 or 253, and 254 or 255 to each of the cutting unit control modules 80, 81, and 82 directing them individually to raise or lower depending upon the operator's selection.

In the preferred embodiment, the master control module 800 also controls some visual and audible operator indicators. Once the system is enabled, the master control module 800 sends a signal 134 to an indicator light 50. If a harmful condition is detected, such as a locked rotor or an overloaded motor (discussed in more detail below), the master control module 800 sends a signal 277 to an audible alarm 276. The mower 10 also provides other indications to the operator of harmful conditions. For example, if a lock rotor or an overloaded motor is detected by any of the cutting unit control modules 80, 81, and/or 82, an LED indicator is illuminated as discussed in more detail below.

The master control module 800 receives inputs from the individual lifts 1, 2, and 3 (not shown) indicating whether the lifts are completely raised 146, 148, and 246 or completely lowered 147, 149, and 247. These signals represent the positions of individual raise and lower switches 140 through 145 for each lift 1, 2, and 3 (not shown).

Each individual cutting control module 80, 81, and 82 responds to the signals sent to it by the master control module 800. If the master control module 800 instructs any of the cutting unit control modules 80, 81, and/or 82 to raise or lower the lift 1, 2, and/or 3, the cutting unit control module 80, 81, and/or 82 provides 48 volts of power to the lift motor 80, 81, and/or 82 so that it can perform the required function. Similarly, if the master control modules 800 instructs any of the cutting unit control modules 80, 81, and/or 82 to activate its respective cutting unit 60, 61, and/or 62, the mow control module 80, 81, and/or 82 provides 48 volts of power to the cutting unit motor 90, 91, and/or 92.

The preferred embodiment of the mower 10 of the present invention has an optional groomer 70, 71, and 72 adjacent each cutting unit 60, 61, and 62. The groomer operation with respect to the solid state mow system is discussed in further detail below. The groomer is an accessory having a front roller and knives that intersect the roller. The roller lifts horizontally growing grasses, and the knives rotate through the roller slots, cutting blades of grass before they can lie down, so grass stands up for a smoother surface. In the preferred embodiment, the groomers 70, 71, and 72 are all controlled from the control panel 96. When the operator activates the groomer switch 170, a signal 171 is sent to each of the cutting unit control modules 80, 81, and 82 to power up the groomer motors 73, 74, and 75. The cutting unit control modules 80, 81, and 82 then provide power to the groomer motors 73, 74, and 75 via signals 173, 174, and 175 respectively.

In the preferred embodiment, the electric mower 10 will not operate unless the correct safety preconditions have been satisfied. FIGS. 2(1) and 3 show various input signals 120, 122, 123, 126, 128 and 131 to the operator presence interlock system 118 that are necessary preconditions to operation. The interlock system 118 located within the master control module 800 receives the following signals: Key_I 120 and Key_S 122 from the ignition 121, seat signal 123, master mow signal 126, brake signal 128, and backlap signal 130.

The ignition 121 for the mower 10 operates with a three way circuit much like an automobile ignition. Key_I 120 represents the signal that is sent from the ignition 121 to the interlock system 118 when the ignition key is placed in the ignition in the first position and turned to the second position. When the key is turned to the third position, Key_S 122 represents the signal sent to the interlock system 118 notifying that the key has properly set the ignition to start the vehicle.

When the operator is correctly positioned in the operator's seat 95, the Seat Switch 124 sends a signal 123 to the interlock system 118.

On the operator's control panel 96, there is a master mow switch 125 that must not activated in order for the mower to start. The master mow switch 125 controls power to each of the cutting units 60, 61, and 62. The signal 126 received by the interlock system 118 indicates that the master mow switch 125 is in the inactive position. The interlock system 118 will not become active if the master mow switch 125 is not inactive.

A brake switch 127 located on the operator's control panel 96 applies the brake (not shown). The brake switch 127 sends a brake signal 128 to the interlock system 118. The brake signal 128 must indicate that the brake switch 127 is in the "ON" position before the interlock system 118 will allow the mower 10 to start.

Finally, for maintenance purposes including sharpening, the cutting units 60, 61, and 62 can be powered in reverse. This mode of operation is called backlap and must be in the inactive position for the mower 10 to operate in the forward or normal mowing mode. In the preferred embodiment, the Backlap Switch 130 also located on the control panel 96 requires a separate key in order to be activated; they key must be in the Key_I position for power, but the mower 10 must not be in the interlock mode.

Once each of these preconditions has been checked and satisfied, the interlock system 118 sends the following outputs: external interlock signal 132, internal interlock signal 133, and a signal to an indicator light 134. The indicator light 134 preferably located on the control panel 96, will be lit when the interlock system 118 is activated. The external interlock signal 132 tells control systems external to the master control module 800 that all of the preconditions for operation have been met and the mower 10 is ready for operation. The internal interlock signal 133 tells the other control systems located in the master control module 800 that the preconditions for operation have been met and the mower 10 is ready for operation.

Those skilled in the art will recognize that the above preconditions for use of the mower 10 are not exhaustive. Other preconditions can be added, or fewer preconditions can be included in the interlock system 118 and still remain within the scope of the present invention.

Figure 10:
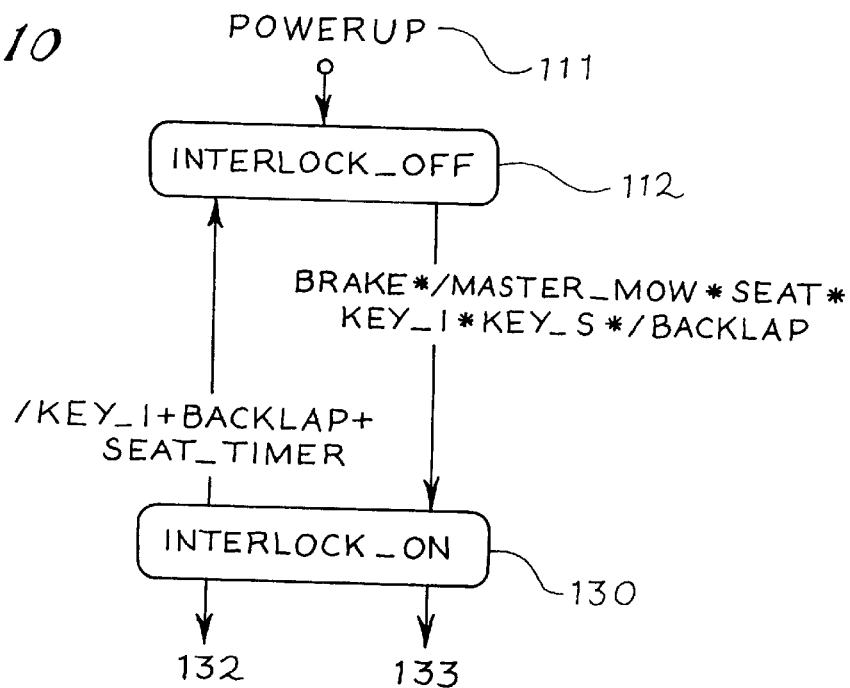
FIG. 10 is the interlock state diagram.

FIG. 10 is the interlock state diagram showing the interaction of the inputs and the outputs of the interlock system 118. Upon POWERUP 111, which occurs when the operator turns the key in the ignition activating KEY_I and KEY_S discussed above, the interlock system 118 is in its off state as indicated by INTERLOCK_OFF 112. Before the state can be changed to INTERLOCK_ON 130, signals for each of the preconditions discussed above must be verified. This requirement is represented in the state diagram FIG. 10 as BRAKE*/MASTER_MOW*SEAT*KEY_I*KEY_S*/BACKLAP. Where "/" represents "not" and "*" represents "and". Once these conditions are satisfied, the interlock system enters the INTERLOCK_ON 130 state. Once in INTERLOCK_ON 130, the interlock system 118 sends an external interlock signal 132 to other control systems on the mower 10, and interlock signal 133 to other control systems on the Master Control Module 800 indicating the mower 10 is ready for operation.

Once in the INTERLOCK_ON state 130, the control system 100 will automatically return to the INTERLOCK_OFF 112 state when either SEAT, KEY_I, or BACKLAP changes state. If the operator removes the key from the ignition; or the operator leaves his seat for a predetermined amount of time, in the preferred embodiment approximately 1 second, thus opening the Seat Switch 122; or if the operator tries to run the mower 10 in backlap mode thus activating the backlap switch 130 the interlock system 118 will be disabled. The occurrence of any of these situations is represented by /KEY_I+BACKLAP+SEAT_TIMER where "/" represents "not" as before and "+" represents "or". Once the interlock system 112 is deactivated, each of the input conditions outlined above must again be satisfied to reactivate the operator interlock system 118 and thus for the mower 10 to be operational.

The mower 10 has lifts 1, 2 and 3 (not shown) which raise and lower the mower cutting units 60, 61 and 62 respectively in response to operator commands. The operator can choose to operate the mower 10 with all three cutting units 60, 61 and 62 in the lowered or operative position, or the operator can choose to operate the mower 10 with any combination of the cutting units 60, 61 and 62 raised. In one embodiment, the lifts 1, 2, and 3 (not shown) are linear actuators, however, other means for lifting the cutting units 60, 61, and 62 can be employed using the solid state mow system 200 of the present invention including but not limited to hydraulics, gears, or chains.

The solid state lift control system 200 (FIG. 4) located in the master control module 800 (FIG. 2(1)) controls the activation of the lifts 1, 2 and 3 (not shown) to raise and lower the cutting units 60, 61, and 62. FIGS. 2(1), 2(2), 2(3), and 4 show that the lift control system 200 must receive the following signals prior to activation: an active internal interlock signal 133 indicating the INTERLOCK_ON state, master raise/lower signal 201 indicating that the operator has depressed the master raise/lower switch 202, raise/lower limit switches 146, 147, 148, 149, 246 and 247 for each of the cutting units must indicate that each cutting unit 60, 61, and 62 is either completely raised or completely lowered, and the individual mow control signals 260, 261, and/or 262 indicate that the operator has activated the individual cutting units 60, 61, and/or 62 by turning switches 160, 161, and 162 on the control panel 96 and signaling the master control module 800 along lines 163, 164, and 165. Once these preconditions have been satisfied, the lift control system 200 controls the operations of the lifts 1, 2, and 3 (not shown) according to the operator's commands.

The master control module 800 and specifically the lift control system 200 located within the master control module 800 provides the following signals to the individual cutting unit control modules 80, 81, and 82: power the individual lift motors 53, 54, and 55, activate the motor overload indicator 230 to determine if the sensed current into any of the lift motors 53, 54, and 55 is greater than a preset amount (discussed in more detail below), and activate the locked rotor indicator 240 to determine if the sensed current into any of the cutting unit motors 90, 91, and 92 is greater than a preset amount (discussed in more detail below).

The motor overload indicator 230 will be active when any of the lift motors 53, 54, or 55 is using more that the rated level of power. Although the preferred level is dependent on the size of the motor, in the presently disclosed embodiment, a level of 12 Amps for more than 30 seconds indicates overload (discussed further below). The signal from the lift control system 200 (FIG. 4) indicating the motor overload condition 230 is connected to any sort of visual and/or audible indicator such as an LED or an alarm 273, 274, 275 (FIG. 2(3)). In the preferred embodiment, each of the cutting unit control modules 80, 81, and 82 has its own motor overload indicator 273 274, and 275. The cutting unit control module 80, 81, or 82 sends a signal 270, 271 or 272 to its respective indicator 273, 274, or 275. This way the operator knows exactly which motor is malfunctioning.

The locked rotor indicators 283, 284, and 285 will be activated with any of the cutting unit motors 90, 91 or 92 are using a current indicative of a locked rotor condition. Although the chosen current to activate the indicator is a design choice, in the presently described embodiment, in a present embodiment, a locked rotor condition will be determined when a current of greater than 20 Amps is detected, and the mower 10 is in POWERUP 111. Other preset current values, however, can be chosen. Upon detection of the locked rotor condition, power to the cutting unit motor 90, 91, or 92 is removed immediately. As described with respect to the motor overload indicators 283, 284, and 285, any sort of visual and/or audible indicators such as an LED or an alarm can be used to indicate this error condition. The indicator can be reset by turning the power OFF and then ON.

Those skilled in the art will recognize that although the presently described embodiment has separate indicators for motor overload and locked rotor for each cutting unit system, one indicator activated upon either sort of malfunction could be used even though using only one indicator would not be as convenient or informative to the operator since he would then have to determine which cutting unit and what problem. Similarly different combinations of warning indicators with varying amount of detail can be used while still remaining within the scope of the present invention.

Short circuit protection (not shown) has also been included on each of the lifts, groomers, and mowers to protect the systems.

Figure 11:
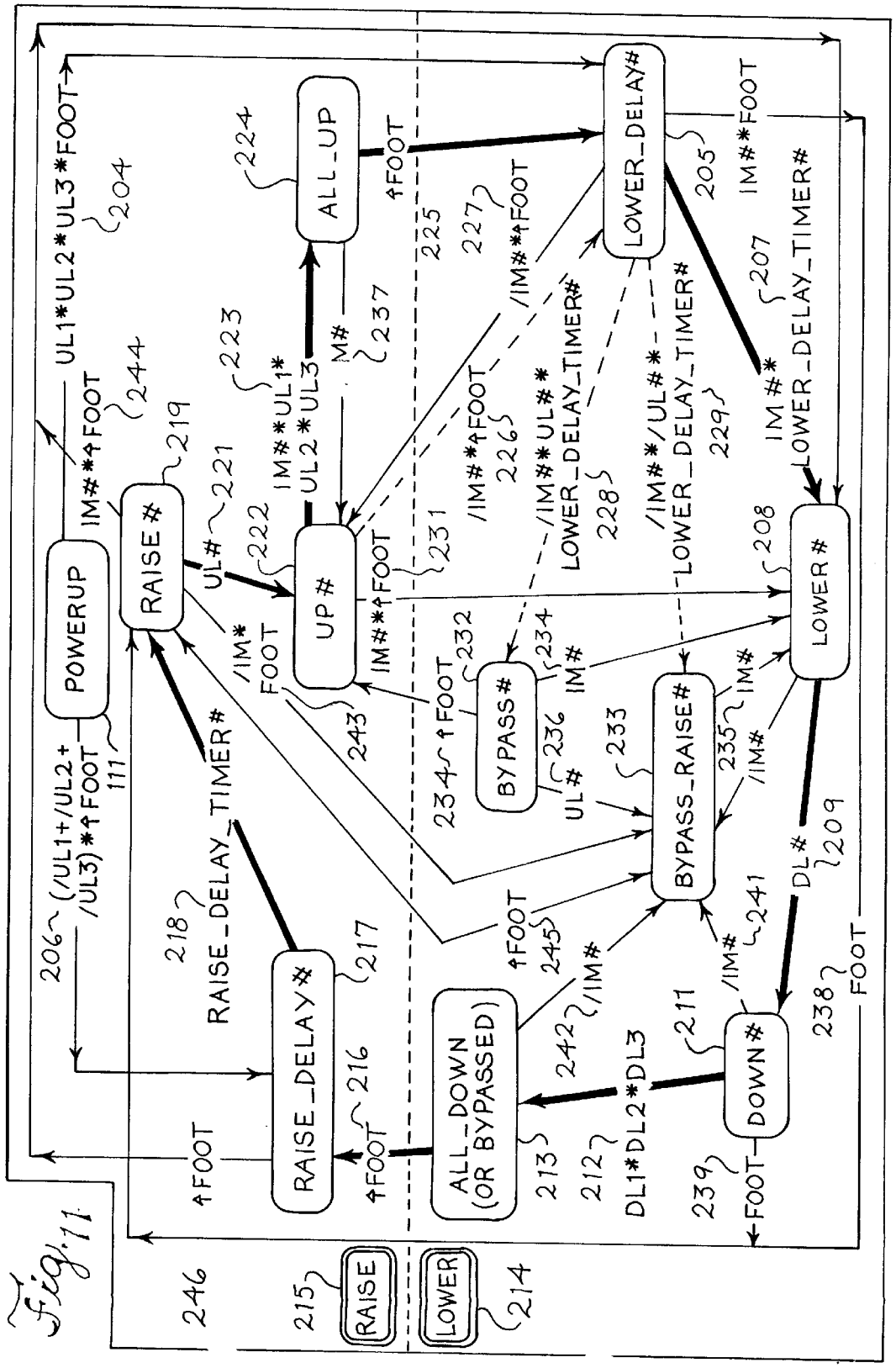
FIG. 11 is the lift state diagram.

FIG. 11 is the lift state diagram for the lift control system 200. The symbols indicated on the diagram are explained in the key shown in FIG. 9. The # variable on the lift state diagram in FIG. 11 and in the key in FIG. 9 represents any of the lifts 1, 2 or 3. The heavy solid lines in FIG. 11 represent the normal path of the cutting unit movement. The dotted lines represent the normal path if a specified cutting unit 60, 61, or 62 is not operational. And, the lighter solid lines represent other transitions between individual mow commands. Operation of the lift represented by the variable # will be explained in detail; one skilled in the art will recognize that the operation of any of the lifts 1, 2 and/or 3 (not shown) follow this description and can be substituted on FIG. 11 for the variable #.

Starting from the POWERUP state 111, the lifts 1, 2, and 3 (not shown) are either all raised 204 or not all raised 206. The all raised position 204 is represented by the UL1*UL2*UL3*FOOT. Referring to FIG. 9 UL# is a switch on lift 1, 2 or 3 (not shown) designating that the lift 1, 2 or 3 (not shown) is in its upper most position; the "*" symbol means "AND", and "FOOT" represents that the operator has depressed the cutting unit master raise/lower switch 202 which is a pedal on the control panel 96. The master raise/lower switch 202 operates as a toggle: if all of the lifts 1, 2, and/or 3 (not shown) are not raised 206, activating the switch 202 raises the not raised lifts 1, 2 and/or 3 (not shown) and thus the cutting units 60, 61, and/or 62. If all of the lifts 1, 2 and 3 (not shown) are raised, closing the master raise/lower switch 202 lowers them. Thus, UL1*UL2*UL3*FOOT 204 reflects that all of the cutting units 60, 61, and 62 are in the raised position, and the operator has depressed the master raise/lower switch 202 to lower them. Following the thin line in the direction of the arrow from 204 to box 205, the LOWER_DELAY# state is reached. In the LOWER_DELAY# state (defined in FIG. 9) the lift # lower delay timer is active. The lifts 1, 2, and 3 (not shown) have delay timers associated with them so that the operator can provide an even start and finish to the cut. In one embodiment, the front lifts 1, and 2 operate on a zero second delay while the rear lift 3 (not shown) has a delay around 0.800+/−0.05 seconds.

In another embodiment, the default delay value for the forward lift mechanisms 1 and 2 is zero seconds, while the default delay value for the rear lift 3 (not shown) is a variable representing the distance and the time it takes for the mower 10 to advance so that the rear cutting unit 62 is in a position parallel with the front cutting units 1 and 2.

In another embodiment, a delay-relay timer (not shown) is programmed with the appropriate delay criteria depending on the speed of the mower 10. This process assures that the starting place of the cut is even on the grass. Those skilled in the art will also note that setting the default delay value for a lift mechanism to zero is comparable to removing the lift delay timer from that lift. From this position LOWER_DELAY# 209, operation on the normal path, the heavy line in FIG. 11, will be discussed.

Following the heavy solid line from the LOWER DELAY# 209 state in the direction of the arrow, IM#*LOWER_DELAY_TIMER#, 207, represents that individual cutting unit # (1 or 2 or 3 (not shown)) has been selected AND corresponding lift # timer has been completed. The delay, therefore, on lowering lift # is over and lift # is active to lower in the LOWER# state 208. From there, as seen on the heavy solid line, lift # is lowered when switch DL# 209 is closed, when lift # reaches the point where the cutting unit corresponding to the lift # is in the down position, lift # has reached the DOWN# state 211.

The same operation is followed for each of the three lifts in going from the all raised position where the operator has activated the switches UL1*UL2*UL3*FOOT 204 to the all lowered position by activating the switches DL1*DL2*DL3 212 where all the lifts are lowering their respective cutting units. Once at the ALL_DOWN (OR BYPASSED) state 213, all of the lifts that have been designated to lower have finished lowering and all of the cutting units on those designated lifts are in the down position. The selected cutting units 60, 61 and/or 62 now are ready for operation.

If, as will be discussed in more detail below, the operator decides to bypass a cutting unit, or not lower it to operation, he may do so and the lift corresponding to that cutting will not be lowered. Such a selection would be useful if a cutting unit was not working correctly, or if the operator simply did not wish to mow the section of the grass that would be under that cutting unit. For example, on a green with curved edges, the individual control can be used to raise one or more of the cutting units when mowing over a concave area of the green. As the mower 10 approaches an edge of the green one of the cutting units 60 or 61 may overhang the fringe area adjacent the green that is not to be cut to the same level as the green. In this situation, the operator simply raises the cutting unit 60 or 61 at the appropriate time so as not to cut the fringe area, and continues cutting the rest of the green with the remaining cutting units. Of course, many other uses for bypassing an individual cutting unit 60, 61, and/or 62 can be envisioned within the scope of the present invention.

As can be seen from FIG. 11, LOWER_DELAY# 205, LOWER# 208, DOWN# 211, and ALL_DOWN (OR BYPASSED) 213 represent the states on the normal path while the cutting units are moving to or are in the lowered position 214.

Now finishing the main loop in FIG. 11, when the operator has finished mowing a pass across the green or has finished mowing the green completely and wishes to move to the next green, back to home base, or elsewhere without operating the cutting units, he depresses the master raise/lower switch 202 to raise the activated lifts 1, 2 and/or 3 (not shown), represented by ↑FOOT 216. Referring to FIG. 9, "↑" means "Inactive to Active Transition", and "FOOT" represents the master raise/lower switch.

The RAISE_DELAY# 217 is active causing the designated lift delay timers to begin counting down. In one embodiment, the default delay value for the forward lifts 1 and 2 is zero seconds, while the default delay value for the rear lift 3 is 0.800+/−0.050 seconds. In one embodiment, the default delay value for the rear lift is a variable representing the distance and the time it takes for the mower 10 to advance so that the rear cutting unit 62 is in a position parallel to where the first cutting units 60 and 61 quit cutting. Of course, other methods of implementing the lift delay can be incorporated into this control system while still remaining within the scope of the invention. It will also be noted, as discussed above, that setting the delay timer to zero is comparable to providing a lift without a delay timer.

Following the heavy solid line, RAISE_DELAY TIMER# 218 means that lift #'s delay to raise has been completed. The delay, therefore, on raising lift # is over and lift # is in the active to raise state as shown at 219 RAISE#. At that point the master/raise lower switch 202 is closed, UL# 221, and lift # (1 or 2 or 3 (not shown)) is raised to the UP# state 222. The individual mow IM# switch is then selected for each lift UL1, UL2, and UL3 at IM#*UL1*UL2*UL3, 223 and all of the cutting units are up as in the ALL_UP state 224. At that point, the procedure for raising the cutting units has been completed and the mower 10 may now run in transport mode to its next pass or destination. When the operator is positioned for the next pass, or arrives at the next green to mow, he simply depresses the master raise/lower switch 202 and the selected lifts are again changed from the inactive to the active position as represented by ↑FOOT 225.

Returning to the POWERUP state 111, where at least one of the lifts 1 or 2 or 3 (not shown) is not raised and the operator presses the master raise/lower switch 202 is represented by /UL1+/UL2+/UL3+↑FOOT, 206. From FIG. 9, "/" means "NOT" and "+" means "OR". The lift control system 200 goes into the RAISE_DELAY# state 217. At this point, the raise delay timer, described above, is activated for any lift (1 and/or 2 and/or 3 (not shown)) that is not in the raised position. The lift control system 200 then follows the main loop as described above, passing through the states RAISE# 219 to UP# 222 until all of the lifts are raised and then to the ALL_UP 224 state. The lift control system in the normal path then behaves as described above going next to the LOWER_DELAY# state 205 and so forth. One skilled in the art will recognize that each of the states POWER_UP 111, RAISE_DELAY# 217, RAISE# 219, UP# 222, and ALL_UP 224 are all states where the lift(s) are in the raised position 215.

The dotted lines of FIG. 11 represent the normal path of the lift control system 200 if at least one of the individual cutting units is not selected or is no longer active. The thin lines of FIG. 11 represent transitions where the lift control system 200 is between the normal path represented by the heavy line, and the normal path if at least one of the individual cutting unit IM# is turned off or no longer active represented by the dotted line. Also, other expected, but uncommon operations are taken into consideration, such as e.g., stopping a raise or lower while in the opposite transition.

Now, following the dotted lines representing the normal path of the lift control system 200 if at least one of the individual cutting units is not selected or is no longer active, starting at the position where the designated lift is in the UP#, state 222, the operator can choose not to activate an individual cutting unit as represented by /IM#. When he presses the master raise/lower switch 202 to begin the process to lower the cutting units, the individual cutting unit is not activated so /IM#*↑FOOT 226. Also, at the UP# state 222, the operator can chose to return to the normal path by selecting the individual cutting unit and activating the master raise/lower switch 202, represented by IM#*↑FOOT 231.

From the state UP# 222, when an individual cutting unit is not activated, represented by dotted line /IM#*↑FOOT 226, the state LOWER_DELAY# 205 is reached. From LOWER_DELAY# 205, the operator can choose to enter the normal lift control path by following heavy line 207 and discussed above; he can return the designated lift(s) to the UP# state 222 by following the thin solid line and activating the master raise/lower switch 202 again /IM#*↑FOOT 227; he can choose not to activate the individual cutting unit motor, lower the lift(s) and complete the lower delay timer for that cutting unit, represented by /IM#*UL#*LOWER_DELAY_TIMER# 228; or he can choose not to activate the individual cutting unit motor, not to place its lift in the raised position and to start its lower delay timer for that cutting unit, represented by /IM#*/UL#*LOWER_DELAY_TIMER# 229.

If /IM#*UL#*LOWER_DELAY_TIMER# 228 is chosen, the individual, raised cutting unit # is bypassed, represented by the BYPASS# state 232. From BYPASS# 232, the operator can activate the master raise/lower switch 202, represented in the state diagram as ↑FOOT 248, returning the lift control system to the UP# state 222 described above, or he can activate the individual cutting unit IM# 234 returning the lift control system to the normal path of operation at LOWER# 208.

If /IM#*/UL#*LOWER_DELAY_TIMER# 229 is chosen, the individual cutting unit is bypassed while the machine is in the overall raise mode and reaches the BYPASS_RAISE# state 233. From the BYPASS_RAISE# state 233, the operator can chose to remain in the individual selected cutting unit state and raise the individual selected cutting unit UL# 236, or he can return to the normal path either by activating the individual mow IM# 235, thus taking the lift control system 200 to the LOWER# state 208 discussed above, or by activating the master raise/lower switch 202 represented in the state diagram by ↑FOOT 245 taking the lift control system 200 to the RAISE# state 219 for that selected cutting unit.

In summary, the IM# will allow normal operation of the selected cutting unit 60, 61, or 62 in the normal position. If IM# is moved to the override or bypass position, the cutting unit is immediately raised. Returning IM# to normal will allow the cutting unit to resume whatever state is would be in if the selected cutting unit IM# had not been in bypass.

Other lift options and combination available on the electric mower 10 include but are not limited to the following selections. From the ALL_UP state 224, where all of the cutting units are up, the operator can chose not to activate a specific cutting unit /IM# 237 which would leave that cutting unit in the UP# state 222 and allow normal operations of the other cutting units where cutting unit # is not selected, i.e., dotted line operations. From the LOWER# state 208, where a designated lift is active to lower, the operator can activate the master raise/lower switch 202 represented on the state diagram (FIG. 11) as FOOT 238, thus changing the designation for that lift from active to lower to active to raise state represented by RAISE# 219. Or, the operator can unselect the designated cutting unit, represented as /IM# 249 sending the cutting unit to the BYPASS_RAISE# state 233. From the DOWN# state 211, where the selected cutting unit is in the down position, the operator may activate the master raise/lower switch 202, represented by FOOT 239, thus changing the designation of for that lift from the lowered position to the active to raise state represented by RAISE# 219; or the operator can deactivate the selected cutting unit /IM# 241, thus taking the lift control system into the BYPASS_RAISE# state 233 for the selected cutting unit 60, 61 and/or 62. From the ALL_DOWN (OR BYPASSED) state 213, where all of the cutting units are down unless selected cutting units are bypassed, the operator can select a specific cutting unit (not already bypassed) and deactivate it /IM# 242.

From the RAISE_DELAY# state 217, where the selected lift's raise delay time is active, the operator can press the master raise/lower switch 202 represented by ↑FOOT 210 to activate the selected lift to lower, LOWER# 208. From the RAISE# state 219, where the selected lift is active to raise, the operator can choose to deactivate the individual cutting unit motor and press the master raise/lower switch 202, /IM*FOOT 243 to bypass raising that lift, BYPASS_RAISE# 233, or he can activate the individual cutting unit motor and activate the master raise/lower switch 202, IM*↑FOOT 244 sending the individual cutting unit to the active to lower state LOWER# 208. It will be appreciated by those skilled in the art that other options are available for the lift control system, that other combinations of activation of the lifts and of the cutting units can be selected; and that the patentee is not limited to the specific embodiment disclosed.

FIGS. 2(1), 2(2), 2(3), and 5 show the mow control system 300 inputs and outputs. The mow control system 300 located within the master control module 800 controls the power to the cutting unit motors 90, 91, and 92. Inputs to the mow control system 300 include: the internal interlock signal 133 indicating that the preconditions for operation of the mower 10 have been met, the mow enable signal 302 from the control panel 96 indicating that the operator is ready to mow, the signal 201 from the master raise/lower switch 202 toggling all of the selected cutting units to the same position, the raise/lower limit signals 146, 147, 148, 149, 246, and 247 for placing each cutting unit 60, 61, and, 62 either raised all of the way, or lowered all of the way, and the individual mow control switches 163, 164, and 165 controlling activation of each of the individual cutting units 60, 61, and 62.

Outputs of the mow control system 300 include signals to the groomer motors 173, 174, and 175 to power the groomers 70, 71, and 72, signals to the motor overload indicators 273, 274, and 275, and the locked rotor indicators 283, 284, and 285. In one embodiment embodiment, the motor control system 300 can pulse width modulate the mow/groomer motor to allow for speed control. The output of the cutting unit motors 90, 91, and 92 is protected against short circuits and cross connection with the groomer motor circuit 400, as explained in more detail below.

During operation, the overload current detector located inside the cutting unit control modules 80, 81, and 82 is designed to allow momentary values above a preset value for overload current. The preset value is determined based on the size of the motor. After 0.5 to 5+\-5% seconds of overload current, the audio or visual indicator 273, 274, or 275 will activate. This delay allows for the motor to startup and for short overloads to occur without alarm. After 5 to 60 seconds +\-5% (initial value 30 seconds) of cumulative overload current, the alarm 276 will activate. After 30 to 120 Seconds +\-5% (initial 60 seconds) cumulative of overload current, the cutting unit motor 90, 91, or 92 will be shut down. Overload monitoring is done within the cutting unit control module 80, 81, and/or 82 by measuring the voltage across a low value resistor and comparing it to predetermined values. The more voltage across the resistor, the larger the current on the cutting unit motor 90, 91 or 92. Other techniques besides the above described can be used while still remaining within the spirit and scope of the present invention.

In the preferred embodiment, the value of the overload timer is set by a permanent, non-adjustable component or program setting. The value can be set by various means depending on the method used to detect the current and the manufacturing requirements. The alarm 276 and shut down timers are cumulative until power 111 is removed from the system via the key switch Key_I 120. The times disclosed herein for alarm and shut off are preferred, but other times are simply a matter of design choice.

In one embodiment the locked rotor current detector is located within the cutting unit control system 80, 81 and/or 82, and can be designed to allow adjustment from 10 to 50 Amps +\-5% (initial value 20 Amps). Preferably, this value is a permanent, non-adjustable component of the program setting, for example, 20 Amps. After 0.5 to 5 seconds +\-5% (initial 2 seconds) of a locked rotor situation the visual indicator 283, 284, or 285 will activate, the audible alarm 276 will activate, and the cutting unit motor 90, 91 and/or 92 will be shut down. Locked rotor monitoring is done within the cutting unit control module 80, 81, and/or 82 by measuring the voltage across a low value resistor and comparing it to predetermined values. The more voltage across the resistor, the larger the current on the cutting unit motor 90, 91 or 92. The value for motor shut down preferably should be set as a permanent, non-adjustable component or program setting.

The controller 100 physically located inside the enclosure 110 (FIG. 1) and shown in diagram form in FIGS. 2(1), 2(2), and 2(3) is designed to protect itself from overload by either withstanding extreme overload (locked rotor) intrinsically or by providing for a protection mechanism which will allow extreme overload not to adversely affect the controller. Those skilled in the art will recognize that these are design capabilities of the controller and are known in the art. The design of the controller prevents severe overloads before any of the components of the controller can be harmed. The times identified above are preferred, however, other times may be chosen.

In the preferred embodiment, during normal mow operation, the desired cutting unit speed is between 1700 and 2200 rpm. The gear ratio is around 22/25, thus the motor speed should be between around 1930 to 2500 rpm. The motors have a soft start feature allowing for the gradual application of power to the motor to bring it up to speed without applying the extreme forces which can be generated by the near instantaneous application of power by a switch, relay, or fast turn on of a transistor. Electric motors generate high levels of torque when power is applied and the rotor is not turning. Gradual application of power limits the torque, which reduces the stress seen by the mechanical components and also reduces the high electrical currents associated with a locked (non rotating) rotor.

Figure 12:
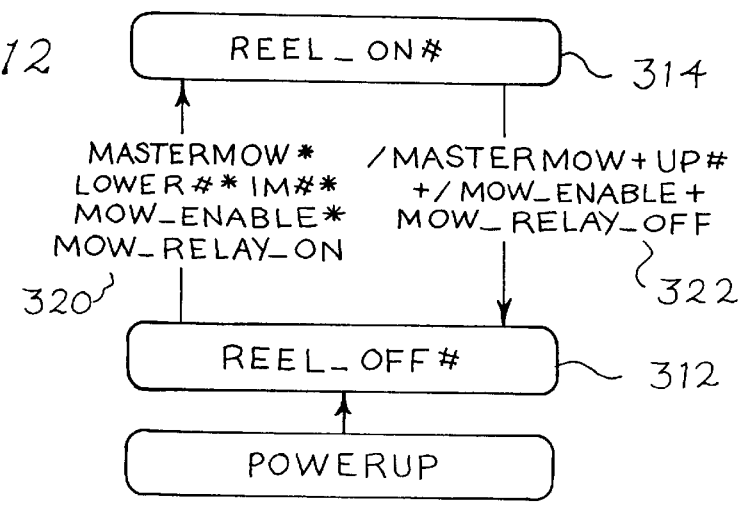
FIG. 12 is the mow control state diagram.

FIG. 12 shows the mow control state diagram. Upon POWERUP 111, the cutting unit motors 90, 91, and 92 are turned off in the REEL_OFF# state 312. When the proper combination of commands is received by the Mow Control 300 (FIG. 5), the selected cutting units will be activated in the REEL_ON# state 314. In one preferred embodiment, the master mow switch 125 must be activated, the selected lifts 1, 2, and 3 (not shown) must be active to lower, the mow enable signal 302 must be pulled to ground, and the mow relay 600 must be active. This combination is represented by the symbols MASTERMOW*LOWER#*IM#*MOW_ENABLE*MOW_RELAY_ON 316. Once the selected cutting units are active, in the REEL_ON# state 314, the cutting units will be deactivated when any one of the following commands are received: the master mow switch 125 is deactivated, or the mow enable signal 302 is deactivated or not pulled to ground, or the mow relay 600 is off. These commands are represented as /MASTERMOW+UP#+/MOW_ENABLE+MOW_RELAY_OFF 318.

In the preferred embodiment of the electric mower 10 each cutting unit 60, 61, and 62 has an optional groomer accessory. The groomer accessory has a front roller and knives that intersect the front roller. The roller lifts horizontally growing grasses, and the knives rotate through the roller slots, cutting blades of grass before they can lie down, so grass stands up for a smoother surface. Regular use of the groomer accessory can increase green speed up to 25 percent, control thatch and eliminate grain. The intersecting action of the groomer's roller and knives is described in detail in U.S. Pat. Nos. 4,494,365 and 4,685,280 both to Lloyd, and U.S. Pat. No. 4,724,662 to Giandenoto and Joray; all three commonly owned by the assignee of this patent and incorporated herein by reference.

Each groomer 70, 71 and 72 is controlled by the groomer control 400 located within the master control module 800. FIGS. 2(1), 2(2), 2(3), and 6 show the inputs and outputs to the groomer control system 400 including: internal interlock signal 133, master raise/lower signal 201, raise/lower limit signals 146, 147, 148, 149, 246, and 247, groomer control signal 171, mow enable signal 302, and individual mow control signals 163, 164, and 165. The outputs of the groomer control 400 include: signals 173, 174, and 175 to the groomer motors 73, 74, and 75, signals 270, 271, and 272 to the motor overload indicators 273, 274, and 275, and signals 280, 281, and 282 to the locked rotor indicator 283, 284, and 285. The groomer control system 400 operates in the same manner as the mow control system 300 described above.

The locked groomer indicators (not shown) can be implemented with this accessory. Basically, the operation of the locked groomer indicator is similar to the locked rotor condition described with respect to the cutting unit control modules. The locked groomer indicator will be activated with any of the groomer motors 73, 74, and/or 75 are using a current indicative of a locked condition. The chosen current to activate the indicator is a design choice. Upon detection of the locked groomer condition, power to the groomer motor 73, 74 or 75 is removed immediately. As described with respect to the locked rotor indicators 283, 284, and 285, any sort of visual and/or audible indicators such as an LED or an alarm can be used to indicate this error condition. The indicator can be reset by turning the power OFF and then ON.

Figure 13:
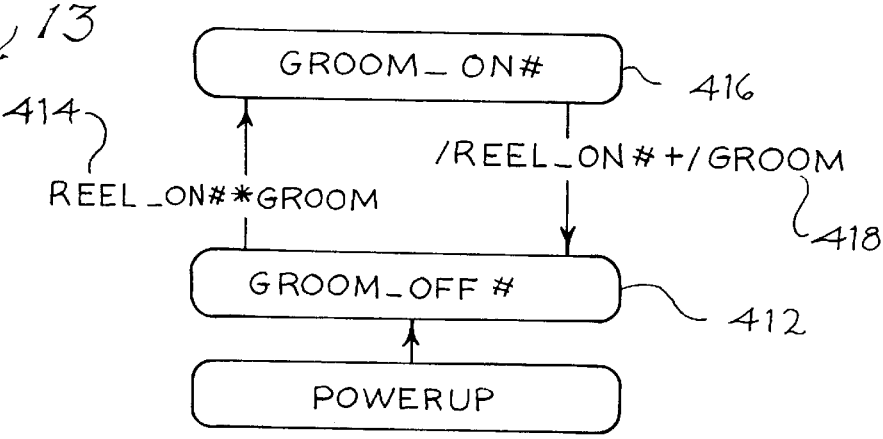
FIG. 13 is the groomer state diagram.

FIG. 13 shows the groomer control state diagram. Upon POWERUP 111, the groomer motors are turned off in the state GROOM_OFF# state 412. When the proper combination of commands is received by the groomer control 400 as described above, the selected groomer(s) will be activated and in the GROOM_ON# state 416. In one preferred embodiment, the selected cutting unit 60, 61, or 62 must be active and the groomer 70, 71, or 72 for that cutting unit must be active, this combination is represented by REEL__ ON#*GROOM 414. The groomer(s) will be deactivated when the selected cutting unit is deactivated or the selected groomer is deactivated. These commands are represented as /REEL__ON# +/GROOM 418.

The mower drive control 300 also has a backlap mode used to hone the cutting edges of the cutting units 60, 61, and 62. FIGS. 2(1), 2(2), 2(3), and 7 describe the inputs and outputs to the backlap control system 500. Inputs to the backlap control system 500 of the drive control 300 include the brake signal 128, the key signal Key__I 120, the backlap service signal 131 and the signals from the individual mow control switches 163, 164, and 165. The outputs of the backlap control system 500 include the cutting unit motor signals 166, 167, and 168 the motor overload signals 270, 271, and 272, and the locked rotor signals 280, 281, and 282. In the preferred embodiment, these outputs are the same as those for the mow control 300 and the groomer control 400 and will not again be discussed in detail. During operation, the backlap control system's 500 motor overload and locked rotor functions operate in the same manner as in the mow control 300 and the groomer control 400. The output of the mower drive motors 90, 91 and 92 is the reverse of normal operation and the cutting unit speed should be regulated to around 100–140 RPM. In the preferred embodiment, the cutting unit 60, 61, and/or 62 is operatively connected to the motor by a pulley. This connection allows freedom of location of the motor 90, 91, and/or 92.

Figure 14:
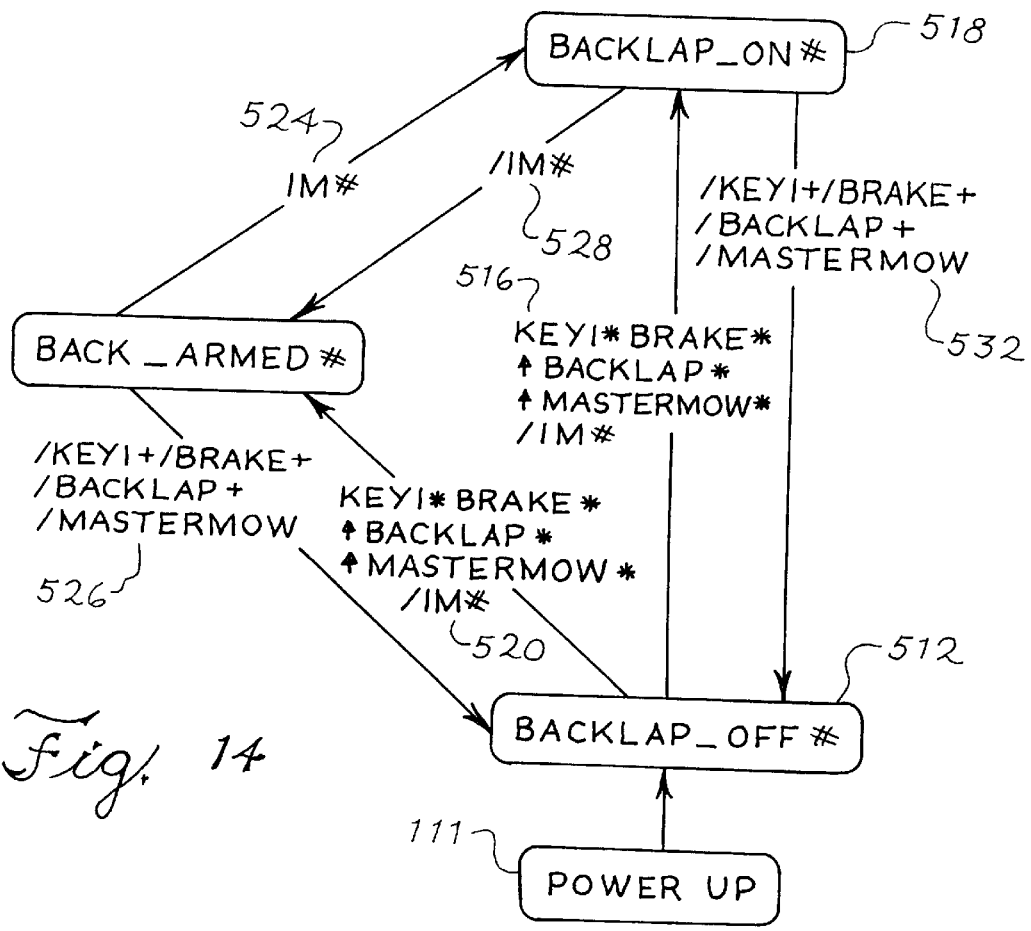
FIG. 14 is the backlap state diagram.

FIG. 14 is the state diagram for one embodiment for one embodiment of the backlap control system 500. Upon POW-ERUP 111, the selected backlap motor is off as represented by the BACKLAP__OFF# state 512. With the correct combination of commands, the operator may select a backlap motor to become active as represented by the BACKLAP__ ON# state 518. In the embodiment shown, all of these commands must be met in order to arm the backlap mode: the ignition 121 must be in the Key__I position, the special backlap key must be in the backlap key hole; the brake must be set 128, the backlap switch 130 must go from inactive to active transition, the master mow switch 125 must go from inactive to active transition, and the specific cutting unit 60, 61, and/or 62 must be selected. This combination is represented by: BACK__ KEYI*BRAKE*↑BACKLAP*↑MASTERMOW*IM# 516.

The preferred embodiment has a separate and different backlap key (not shown) from the ignition key. This safety precaution is to prevent an operator from accidentally running the mower in backlap when he intends to power it normally. The backlap key is for service personnel. Although a separate key is preferred, other means of preventing accidental use of the backlap mode are also viable. For example, a special or rocker switch could be employed.

The Key__I state represents that the key is in the ignition to provide power to the master control module 800, but the key has not been turned to the start position, Key__S.

In the BACKLAP__ARMED# state 522, the operator can either set the backlap to active, BACKLAP__ON# 518 by selecting the selected individual cutting unit IM# 524, or he can turn the backlap for the selected cutting unit off, BACKLAP__OFF# 512, by deactivating any one of the switches activated to arm the backlap, BACKLAP__ ARMED# 522. The switches that can be deactivated include: the backlap switch 130, or the ignition 121 in the Key__I position or, the brake switch 127, or the backlap switch 130 or the master mow switch 125. Opening any one of these switches deactivates the backlap system 500 as is represented by: /KEYI+/BRAKE+/BACKLAP+/ MASTERMOW 526.

From the BACKLAP__ON# state 518, the operator can deactivate the backlap mode either by deactivating the selected cutting unit /IM# 528 sending the cutting unit to the BACKLAP__ARMED# state 522, or the operator can deactivate any one of the combination of signals activated to put the cutting unit in backlap mode BACKLAP__ARMED# 522 thus turning the backlap off, BACKLAP__OFF# 512. Deactivating any one of these switches is represented by: /KEYI+/BRAKE+/MASTERMOW 532.

In the preferred embodiment, the cutting unit driver 300 and the groomer driver 400 are provided with a physical disconnect mechanism in the event of catastrophic failure such as short circuited output transistor or short circuited wiring. The physical disconnect embodied in the mow relay system 600 prevents other systems in the controller 100 from being damaged by the failure. The mow relay system 600 disconnects the drive circuitry from the power source.

FIGS. 2(1), 2(2), 2(3), and 8 show the inputs and outputs for the mow relay system 600 located in the master control module 800. The mow relay system 600 is controlled as a circuit breaker; it is a mechanical switching device that carries current under normal conditions but interrupts the current under abnormal conditions. The mow relay system 600 has the following inputs: internal interlock signal 133, master raise/lower signal 201, raise/lower limit signals 146, 147, 148, 149, 246, 247, groomer control signal 171, and individual mow control signals 163, 164, 165. The mow relay signal 610 disconnecting power to the associated system is the output from this system 600.

Figure 15:
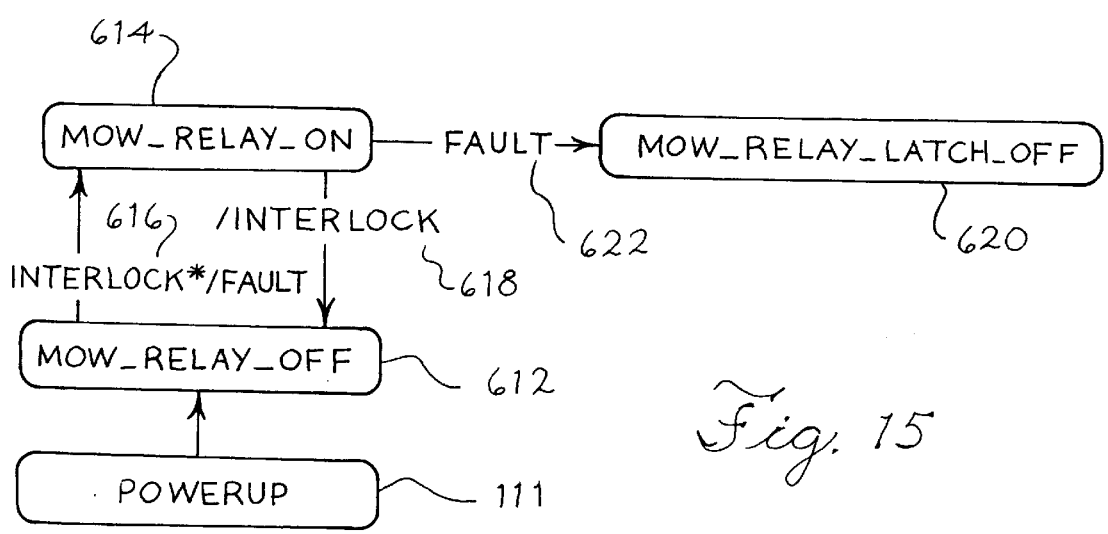
FIG. 15 is the mow relay state diagram.

FIG. 15 is the mow relay state diagram. From POWERUP 111, the mow relay is off, MOW__RELAY__OFF 612. In order for the mow relay to reach the active state MOW__ RELAY__ACTIVE 614,the interlock system 118 must be operating correctly and a fault must not be detected INTERLOCK*/FAULT 616. Once the mow relay is active MOW__RELAY__ACTIVE 614, mow relay can be deactivated by disengaging the interlock 112, represented as /INTERLOCK 618, or if the system finds a fault in the mow control 300 or the groomer control 400 both represented by FAULT 622. If a fault is found, the mow relay latch is turned off, MOW__RELAY__LATCH__OFF 620 and the systems shut down.

The preferred embodiment of the mower 10 has a diagnostics display 97, FIG. 1, to indicate the system status to the operator. The diagnostics display 97 has an alarm 276 and visual indicators represented by LEDS__ON 278. Although many types of indicators are possible, the visual indicator should preferable be visible in sunlight and the alarm 276 should be loud enough to hear from several feet away from the mower 10. Using these indicators during operation, the operator will be apprised of the interlock system 118 status, and will be notified if there is a motor overload 270, 271, or 272 or a locked rotor 280, 281, or 282.

A typical operation cycle for an electric mower 10 of the present invention is as follows: Approach the green in transport mode; switch to mow mode; activate mow switch; lower cutting units (1–2 seconds); mow across green (10–30 seconds); raise cutting units (1–2 seconds); turn around (6 seconds); repeat steps 3–6 (15–20 times); clean up pass; lower cutting units; mow around outer perimeter of green (30–60 seconds); raise cutting units; optional switch to transport mode; travel (20–120 seconds) to the next green; repeat 10–20 times.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A solid state control system for a mower comprising:
   an interlock system located in a programmable logic device, the interlock system to monitor input signals to the solid state control system and to enable operation of the mower;
   a cutting unit control system operably connected to the interlock system, the cutting unit control system to control power to at least one cuffing unit;
   a lift control operably connected to the interlock system, the lift control system to selectively raise and lower the at least one cutting unit; and
   a groomer control system operably connected to the interlock system, the groomer control system to control a groomer used in conjunction with the at least one cutting unit.

2. A solid state control system for a mower comprising:
   an interlock system located in a programmable logic device, the interlock system to monitor input signals to the solid state control system and to enable operation of the mower;
   a cutting unit control system operably connected to the interlock system, the cutting unit control system to control power to at least one cutting unit;
   a lift control operably connected to the interlock system, the lift control system to selectively raise and lower the at least one cutting unit;
   a backlap switch; and
   a backlap control system operably connected to the backlap switch, the backlap control system to power the at least one cutting unit in reverse upon activation of the backlap switch.

3. A solid state control system for a mower comprising:
   an interlock system located in a programmable logic device, the interlock system to monitor input signals to the solid state control system and to enable operation of the mower;
   a cutting unit control system operably connected to the interlock system, the cutting unit control system to control power to at least one cutting unit;
   a lift control operably connected to the interlock system, the lift control system to selectively raise and lower the at least one cutting unit;
   a current detector located inside the cutting unit control system, the current detector to detect a current in a motor above a preset value;
   an overload timer operatively connected to the current detector, the overload timer counting time the current in the motor remains above the preset value; and
   a relay operatively connected in a circuit with the motor, the relay to open the circuit when the overload timer has detected the current above the preset value for the set amount of time.

4. The solid state control system of claim 3 further comprising an overload indicator located on an operator control panel, the overload indicator activated by the overload timer after the overload timer has detected the current above the preset value for a set amount of time.

5. A solid state control system for a mower comprising:
   an interlock system located in a programmable logic device, the interlock system to monitor input signals to the solid state control system and to enable operation of the mower;
   a cutting unit control system operably connected to the interlock system, the cutting unit control system to control power to at least one cutting unit;
   a lift control operably connected to the interlock system, the lift control system to selectively raise and lower the at least one cutting unit;
   a current detector located inside the lift control system, the current detector to detect a current in the lift control system above a preset value;
   an overload timer operatively connected to the current detector, the overload timer counting time the current in the lift control system remains above the preset value; and
   a relay operatively connected in a circuit with the lift control system, the relay to open the circuit when the overload timer has detected the current above the preset value for the set amount of time.

6. The solid state control system of claim 5 further comprising an overload indicator located on an operator control panel, the overload indicator activated by the overload timer after the overload timer has detected the current above the preset value for a set amount of time.

7. A solid state control system for a mower comprising:
   an interlock system located in a programmable logic device, the interlock system to monitor input signals to the solid state control system and to enable operation of the mower;
   a cutting unit control system operably connected to the interlock system, the cutting unit control system to control power to at least one cutting unit;
   a lift control operably connected to the interlock system, the lift control system to selectively raise and lower the at least one cutting unit;
   a current detector located the groomer control system, the current detector to detect a current in the groomer control system above a preset value;
   an overload timer operatively connected to the current detector, the overload timer counting time the current in the groomer control system remains above the preset value; and
   a relay operatively connected in a circuit with the groomer control system, the relay to open the circuit when the overload timer has detected the current above the preset value for the set amount of time.

8. The solid state control system of claim 7 further comprising an overload indicator located on an operator control panel, the overload indicator activated by the overload timer after the overload timer has detected the current above the preset value for a set amount of time.

9. The solid state control system of claim 8 wherein the preconditions to operation comprise:
   a weight applied to a seat; and
   a brake is applied to the mower.

10. The solid state control system of claim 9 wherein the preconditions to operation further include that a backlap mode not activated.

11. A solid state control system for a mower comprising:
    an interlock system located in a programmable logic device, the interlock system to monitor input signals to the solid state control system and to enable operation of the mower;

a cutting unit control system operably connected to the interlock system, the cutting unit control system to control power to at least one cutting unit;

a lift control operably connected to the interlock system, the lift control system to selectively raise and lower the at least one cutting unit;

an interlock signal from the interlock system to indicate that the interlock system is enabled;

an activation signal from a control panel indicating activation of the lift control;

a selected signal from the control panel indicating if the cutting unit is selected;

a position signal from a cutting unit control module indicating a position of the cutting unit; and a lift control signal from the lift control to provide power to a lift mechanically connected to the cutting unit.

12. A solid state control system for a mower comprising:

an interlock system located in a programmable logic device, the interlock system to monitor input signals to the solid state control system and to enable operation of the mower;

a cutting unit control system operably connected to the interlock system, the cutting unit control system to control power to at least one cutting unit;

a lift control operably connected to the interlock system, the lift control system to selectively raise and lower the at least one cutting unit;

an interlock signal from the interlock system to indicate that the interlock system is enabled;

a selected signal from the control panel indicating if the cutting unit is selected;

an activation signal from a control panel indicating activation of the cutting unit; and a mow signal from the mow control to provide power to the one cutting unit.

13. The solid state control system of claim 1 wherein the groomer control further comprises:

an interlock signal from the interlock system to indicate that the interlock system is enabled;

a selected signal from the control panel indicating if the cutting unit is selected;

an activation signal from a control panel indicating activation of the cutting unit;

a mow signal from the mow control to provide power to the cutting unit; and a groom signal from the control panel to provide power to at least one groomer.

14. The solid state control system of claim 2 wherein the backlap control further comprises:

a signal from a control panel indicating if a brake is applied;

a signal from an ignition indicating if a key has been inserted;

a signal from the control panel indicating if backlap mode has been selected;

an activation signal from the control panel indicating activation of the cutting unit; and a mow signal from the mow control to provide power to the cutting unit.

15. A method for safely starting a mower controlled by a solid state control system comprising the steps of:

receiving an ignition signal in the solid state controller from an ignition, the ignition signal supplying power to the solid state controller;

receiving a start signal from the ignition indicating that the solid state control system is enabled;

receiving a seat signal from a seat switch indicating that an operator is present in an operator seat;

receiving a brake signal from a brake switch indicating that the brake is applied;

receiving a master mow signal from a master mow switch indicating that a cutting unit is active to mow; and sending a ready signal to systems in the solid state controller indicating that the mower is ready to operate.

16. The method of claim 15 further comprising the step of providing power to an indicator light showing that the mower is ready to operate.

17. The method of claim 15 further comprising the step of receiving a backlap signal from a backlap switch indicating that the cutting unit on the mower is disabled to operate in reverse.

18. A method for operating at least one lift on a mower controlled by a solid state control system comprising the steps of:

receiving a ready indicating that the mower is ready to operate;

receiving a location signal indicating a position of the at least one lift;

receiving a toggle signal to change the position of the at least one lift;

sending a position signal to the at least one lift to change position;

providing power to the at least one lift; and changing position of the at least one lift.

19. The method of claim 18 further comprising the step of receiving a selection signal indicating that at least one cutting unit operably connected to the at least one lift is selected.

20. The method of claim 18 further comprising the step of monitoring the current powering a lift motor.

21. The method of claim 20 further comprising the steps of:

determining if the current across the lift motor is above a preset value; and if the current across the lift motor is above a preset value, disconnecting power to the at least one lift.

22. A method for operating at least one cutting unit on a mower controlled by a solid state control system comprising the steps of:

receiving a ready signal indicating that the mower is ready to operate;

receiving a selected signal for the at least one cutting unit from an operator interface, the selected signal indicating that the at least one cutting unit has been selected to operate;

providing power to the at least one cutting unit; and operating the at least one cutting unit.

23. The method of claim 22 further comprising the step of monitoring the current powering a motor for the at least one cutting unit.

24. The method of claim 23 further comprising the steps of:

determining if the current across the motor is above a preset value; and if the current across the cutting unit motor is above a preset value, disconnecting power to the at least one cutting unit.

25. A method for operating at least one groomer on a mower controlled by a solid state control system comprising the steps of:

receiving a ready signal indicating that the mower is ready to operate;

receiving a groom signal from an operator panel;

providing power to the at least groomer; and operating the at least one groomer.

26. The method of claim 25 further comprising the step of monitoring the current powering a motor for the at least one groomer.

27. The method of claim 26 further comprising the steps of:

determining if the current across the motor is above a preset value; and if the current across the groomer motor is above a preset value, disconnecting power to the at least one cutting unit.

28. A method for operating at least one cutting unit in reverse on a mower controlled by a solid state control system comprising the steps of:

receiving a power signal from an ignition;

receiving a ready signal indicating that the mower is ready to operate;

receiving a brake signal from an operator interface indicating a brake is applied;

receiving a selection signal indicating that a cutting unit has been selected;

receiving a backlap signal from the operator interface indicating the intention to operate the cutting unit in reverse;

sending a signal to the cutting unit to operate in reverse; and providing power to the cutting unit.

29. A method for monitoring the operation of a mower controlled by a solid state control system comprising the steps of:

receiving a power signal from an ignition;

receiving a first status signal from at least one cutting unit;

receiving a second status signal from at least one lift;

monitoring the first and second status signals to determine if a fault in power to the cutting unit or a fault in power to the lift has occurred;

interrupting power to the cutting unit if the fault in power to the cutting unit has occurred; and interrupting power to the lift if the fault in power to the lift has occurred.

\* \* \* \* \*